United States Patent

[11] 3,536,214

| [72] | Inventors | Robert P. Sorg<br>8241 Lake Drive;<br>Gale A. Steinhaus, 866 Main St., Lino Lakes, Minnesota |
|---|---|---|
| [21] | Appl. No. | 783,027 |
| [22] | Filed | Dec. 11, 1968 |
| [45] | Patented | Oct. 27, 1970 |

[54] TURNTABLE TRAILER APPARATUS
13 Claims, 6 Drawing Figs.

[52] U.S. Cl. ................................................. 214/85,
104/44, 105/366, 105/455, 296/61
[51] Int. Cl. ................................................... B60p 3/06
[50] Field of Search ......................................... 214/85,
505, 506, 83.24, 38.10; 94/44; 105/455, 366(B);
104/44, 47, 35; 296/61

[56] References Cited
UNITED STATES PATENTS

| 1,797,830 | 3/1931 | Koehler | 104/44 |
| 2,544,113 | 3/1951 | Snead | 94/44 |
| 2,572,776 | 10/1951 | Smith | 94/44 |
| 3,025,985 | 3/1962 | Crawford | 214/505 |
| 3,255,899 | 6/1966 | Mengel | 104/44 |

*Primary Examiner*—Albert J. Makay
*Attorney*—Dugger, Peterson, Johnson and Westman ABSTRACT: Turntable trailer apparatus that includes a wheel mounted trailer frame, a turntable mounted on the trailer frame for rotation about a vertical axis through 360°, a ramp, and ramp mounting mechanism for mounting the ramp on the trailer frame for movement between a first position wherein the ramp extends vertically and prevents rotation of the turntable relative the trailer frame, a second position that the ramp is inclined to extend from the level of the turntable to the ground, and a third position that the ramp has one end bearing against the ground and an opposite end at a lower elevation than the turntable whereby the turntable may be freely rotated. There is also provided mechanism for locking the ramp mounting mechanism in the ramp second position, and alternately preventing the said opposite end of the ramp moving more adjacent the ground than the third position.

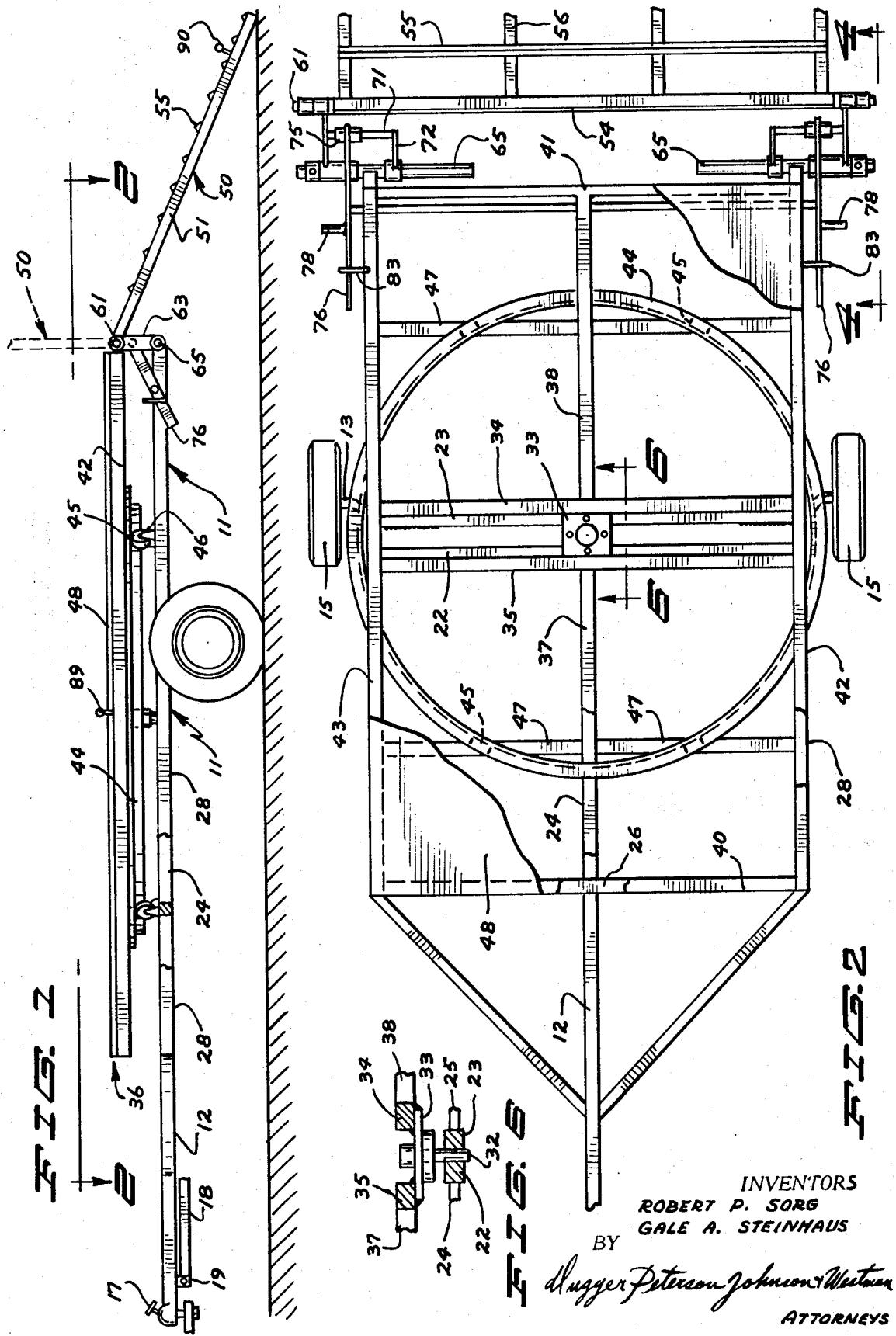

Patented Oct. 27, 1970

INVENTORS
ROBERT P. SORG
GALE A. STEINHAUS
BY
Dugger, Peterson, Johnson & Westman
ATTORNEYS

TURNTABLE TRAILER APPARATUS

BACKGROUND OF THE INVENTION

Turntable trailer apparatus having a ramp movable between a position blocking rotation of the turntable and an inclined loading position.

In the prior art, for example, U.S. Pat. No. 3,025,985 to Crawford discloses a trailer having a ramp mounted on the trailer frame that is pivotable between a loading position and a vertical position, but does not contain any disclosure relative to providing a turntable on the trailer frame. British Pat. No. 588,688 discloses a trailer having a trailer frame and a turntable rotatably mounted on the trailer frame but does not disclose any provision relative to providing a ramp.

SUMMARY OF THE INVENTION

A trailer having a trailer frame with a turntable mounted thereon for rotation about a vertical axis and a ramp mounted on the trailer frame for movement between a position for driving a vehicle from ground level onto the turntable and a vertical transport position. Preferably the ramp in both the loading position and vertical position block rotation of the turntable, and is movable to a third position permitting rotation of the turntable.

Apparatus of the nature of the above mentioned prior art does not suggest providing trailer apparatus having a turntable and a ramp whereby vehicles such as snowmobiles may be driven up the ramp onto the turntable, the ramp then moved to a transport location, and thereafter the ramp moved from the transport position, the turntable rotated 180° and the snowmobile being driven forward down the ramp when the ramp is in a vehicle unloading position. In this connection it is to be noted that most makes of snowmobiles now on the market do not have a reverse drive. Thus this invention does away with having to manually drag a snowmobile without a reverse drive through 180° for purposes of facilitating unloading.

By providing a generally rectangularly shaped turntable that has a generally centrally located pivot axis, the ramp in a vertical transport position on a vehicle loading position blocks rotation of the turntable when the turntable is in either a datum position or a position angularly spaced 180° therefrom. By mounting the ramp to move to a third position, the turntable may be freely rotated. Locking mechanism retains the ramp in either of the loading position or the third position. With the above mentioned structure, a turntable having a large carrying area relative the length of the bed that otherwise would be provided on a trailer frame with a ramp can be provided at a reasonable cost.

BRIEF DESCRIPTION OF THE DRAWINGS

FIG. 1 is a side view of the apparatus of this invention with the ramp being shown in a vehicle loading position in solid lines and in a transport position in dotted lines, a portion of the trailer frame being broken away;

FIG. 2 is a plan view of the structure of FIG. 1 other than most of the bed plate is broken away, only a portion of the ramp is illustrated, the ramp is shown in a position to permit rotation of the turntable, and portions of the turntable frame are broken away, said view being generally taken along the line and in the direction of the arrows 2–2 of FIG. 1;

FIG. 6 is a vertical cross-sectional view generally taken along the line and in the direction of the arrows 6–6 of FIG. 2 to show the mounting of the turntable on the trailer frame.

DESCRIPTION OF THE PREFERRED EMBODIMENT

Figure 3:
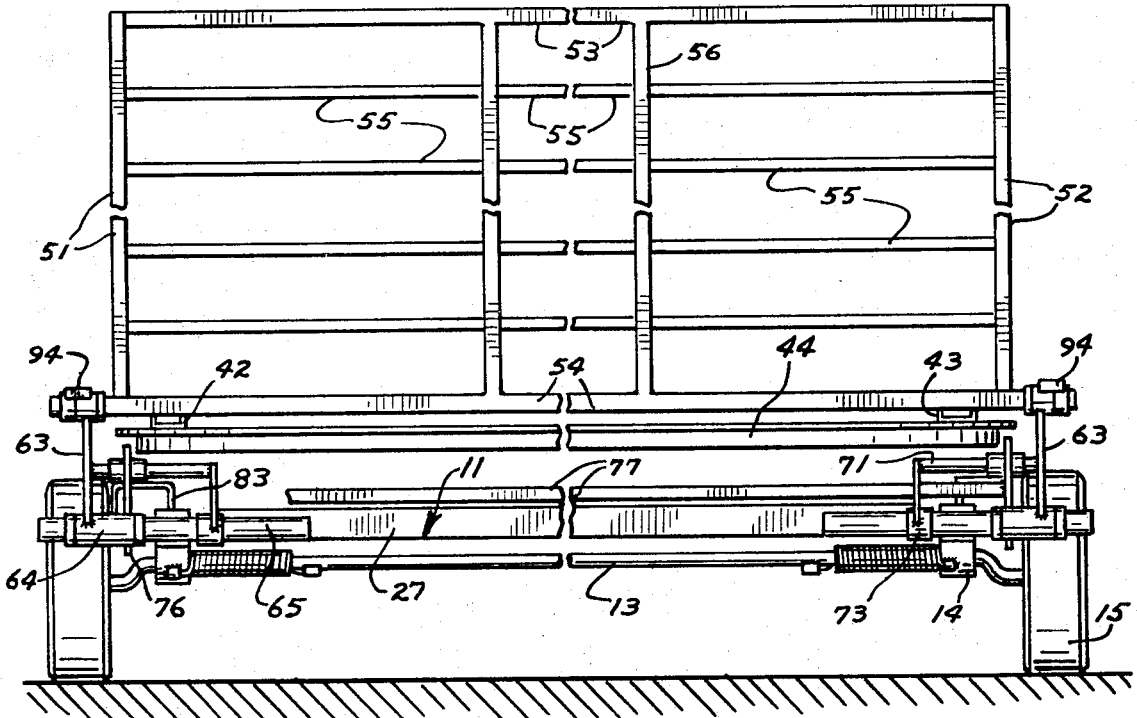
FIG. 3 is a rear view of the apparatus of this invention with the ramp in a vertical transport position, vertical and horizontal central portions of the structure being broken away.

Referring now to the drawings and in particular to FIGS. 1 and 2, there is shown a trailer that includes a longitudinally elongated, generally rectangular trailer frame, generally designated 11 that dependingly mounts a pair of laterally spaced centrally located blocks 14. The blocks 14 are mounted on an axle 13, the axle at either end rotatably mounting a wheel 15 whereby the trailer frame is supported in an elevated condition relative the ground. A drawbar 12 that at its forward end mounts a hitch 17 is provided for attaching the trailer frame to a powered vehicle such as an automobile. Advantageously a stand 18 is pivotally connected to the forward end portion of the drawbar by pivot member 19 to permit the stand being moved between the transport position shown in FIG. 1 and a vertical position supporting the drawbar in an elevated position relative the ground. Suitable mechanism (not shown) may be provided for releasably locking the stand in the transport position.

The trailer frame includes a pair of longitudinally centrally located, laterally extending frame members 22, 23, a longitudinally extending frame member 24 having one end attached to the frame member 22 and a longitudinally extending frame member 25 having one end attached to frame member 23. The opposite ends of frame members 24, 25 are attached to the front and rear frame members 26, 27 respectively of the trailer frame. A pair of side frame members 28 have their front ends welded to the opposite ends of frame member 26 and are also welded to the opposite ends of frame members 27 to extend a short distance rearwardly of frame member 27.

A stud shaft 32 is welded to frame members 22, 23 in longitudinal alignment with frame members 24, 25 to extend a substantial distance thereabove. Mounted on the upper end portion of the stud shaft 32 to rotate about a vertical axis is a load support member 33 that forms a part of the generally rectangular turntable, generally designated 36 which in plan view advantageously may be of about the same area as the trailer frame. The axis of rotation of the turntable is centrally located relative the turntable. The turntable includes a pair of longitudinally centrally located cross braces 34, 35 that have central portions welded to opposite edges of the member 33, the one end of the central longitudinal frame member 37 being welded to one end of frame member 35 and the opposite end to the forward lateral frame member 40. A corresponding central longitudinal frame member 38 at one end is welded to frame member 34 and at the opposite end to the rear lateral frame member 41. Longitudinal side frame members 42, 43 respectively have their one ends welded to the opposite ends of frame member 40 and their other ends welded to the opposite ends of frame member 41. A bed plate 48 is attached in overlying relationship to frame members 40—43. Advantageously the above mentioned trailer and turntable frame members are rectangular tubular channels even though frame members 22, 23, 34, and 35 are shown as being of solid cross section.

Welded to frame members 37, 38, 42 and 43 to depend therefrom and be concentric with the axis of rotation of mounting member 33 is a turntable ring 44 having a depending flange. The ring 44 bears against a plurality of rollers 45 that are rotatably mounted by roller mounting members 46 to rotate about axes at an elevation above the trailer frame. The mounting members 46 are mounted on intermediate lateral braces 47, braces 47 having their opposite ends welded to adjacent side and central longitudinal frame members of the trailer frame.

A ramp, generally designated 50, includes a pair of side frame members 51, 52, a first end lateral frame member 53 that at its opposite ends is welded to the one ends of the adjacent side frame members 51, 52; and an opposite end lateral frame member 54 that is welded to the opposite ends of frame members 51, 52. The ramp also includes a plurality of lateral frame members 55 and longitudinal frame members 56 that are welded together and to the adjacent frame members 51—54.

Since the structure for mounting the ramp on the trailer frame at the opposite lateral rear corner portions of the trailer frame is the same, the ramp mounting mechanism, generally designated 60 will be primarily described with reference to the lower righthand corner portion of the trailer that is illustrated in FIG. 2. The ramp mounting mechanism 60 includes a pair of horizontal stud shafts 61, one stud shaft being welded to either end of the lateral frame member 54 to extend horizontally outwardly thereof in horizontal alignment. An annular member 62 is rotatably retained on stud shaft 61, one end of an arm 63 being welded to member 62 to extend radially outwardly therefrom. The opposite end of arm 63 is welded to an annular member 64 to extend radially relative thereto, annular member 64 being rotatably mounted on an end portion of shaft 65 that extends outwardly of the respective frame member 28. The central portion of each shaft 65 is welded to the adjacent rearward end portion of the side trailer frame member 28 whereby shafts 65 are horizontally aligned. As a result the ramp may be pivoted about the axes of shafts 61 and additionally the combination of the ramp and arms 63 may be pivoted about the axes of shaft 65, the axes of shaft 61 being parallel to the axes of shafts 65.

Figure 4:
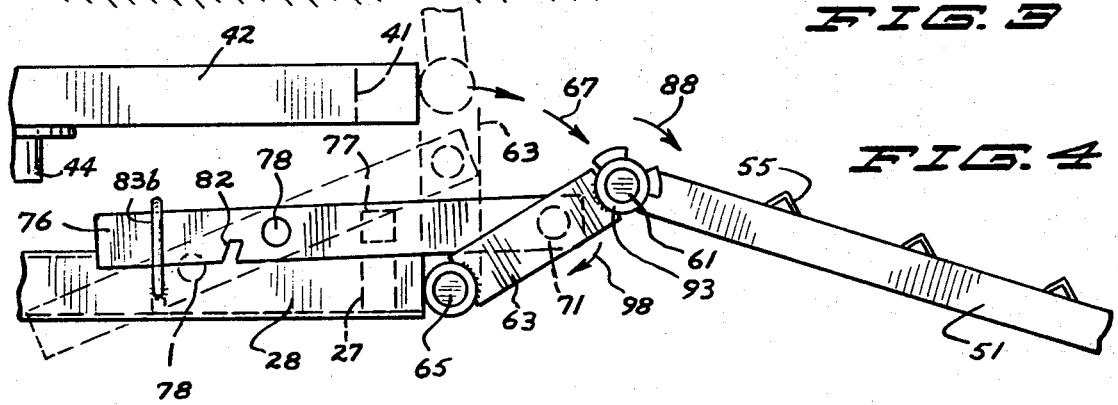
FIG. 4 is an enlarged fragmentary view of the rear end portion of the trailer frame and turntable and adjacent portions of the ramp, said view showing the ramp and ramp mounting and locking mechanism in solid lines in the same position illustrated in FIG. 2, and the ramp and ramp mounting and locking mechanism in a transport position in dotted lines.
Figure 5:
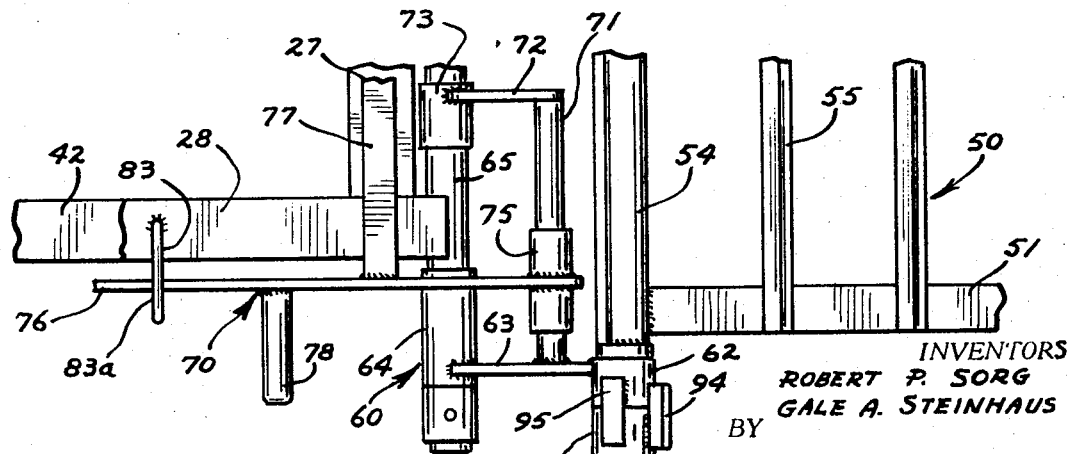
FIG. 5 is a fragmentary horizontal view of the structure of FIG. 4, only one corner portion of the trailer frame and the adjacent ramp corner portion being shown, said view being taken with the ramp in the position of FIG. 2.

In order to lockingly retain each arm 63 in a vertical position and to limit the pivotal movement of said arms in the direction of the arrow 67 to the inclined upwardly and rearwardly extending position of FIG. 4, there is provided the locking mechanism generally designated 70. The mechanism 70 includes a pair of horizontally aligned shafts 71 that at their one ends are joined to an intermediate portion of the adjacent arm 63 and at their opposite end to an arm 72. The opposite end of each arm 72 is welded to a mounting member 73 that in turn is rotatably mounted on shaft 65 on the opposite side of the adjacent member 28 from the respective mounting member 64. On each shaft 71 intermediate arm 63, 72 there is rotatably mounted an annular lock arm mounting member 75, the one end of the lock arm 76 being welded to the mounting member 75 to extend radially outwardly thereof. A transverse bar 77 is located vertically intermediate the turntable frame and the trailer frame and at each end is welded to the intermediate portion of the adjacent lock arm 76 whereby when one lock arm is pivoted, the other will be pivoted the same angular distance. Radially outwardly of annular member 75 from bar 77, a handle member 78 is attached to each lock arm 76 to extend horizontally outwardly therefrom in the direction away from the trailer frame. The lock arm has a downwardly opening notch 82 that is located further radially outwardly from the respective mounting member 75 than the handle 78.

For each trailer frame member 28 there is provided a bent rod lock member 83 that has a lower horizontal leg welded to the adjacent vertical surface of the frame member 28, a vertical leg 83b joined to the opposite end of the lower horizontal leg to extend upwardly therefrom in generally parallel relationship to the vertical surfaces of frame member 28, an upper horizontal leg 83a that at one end is joined to the upper end of leg 83b and at the opposite end to one end of a vertical leg, the opposite end of the last mentioned vertical leg being welded to the top surface of frame member 28. The notch 82 and lock member 83 are located such that when the lower horizontal leg of lock member 83 is located in notch 82, the arms 63 are retained in a vertical upright condition while when the arms 63 are moved to the turntable turning position of FIG. 4 the lock arms bear against the upper horizontal legs 83a and the bar 77 bears against the trailer frame members 28 to limit the pivotal movement of the arms 63 in the direction of the arrow 67 about shaft 65 to the solid line position shown in FIG. 4.

To be mentioned is that in place of locating bar 77 such that it will abut against the trailer frame to limit the pivotal movement of arms 63 in the direction of arrow 67, annular member 64 may have an outside diameter whereby the lock arms in abutting against the legs 83a and members 64 of such diameters will limit the movement of arms 63 in the direction of arrow 67 to the solid line position illustrated in FIG. 4.

In order to retain the ramp in the vertical upright dotted line position of FIG. 1 and prevent it from rotating in the direction of arrow 88 about the pivot axes of shafts 61, a pair of eye bolts 89 are extended through the bed plate and mounted by the longitudinally central portion of the respective turntable frame member 42, 43. Also an eye bolt 90 is mounted by each of the ramp frame members 51, 52 more closely adjacent frame member 53 than frame member 54; there being provided chains (not shown) that at their one ends are attached to eye bolts 90 and at their opposite ends to eye bolts 89.

In order to retain the ramp in the dotted line vertical condition of FIG. 1 and to prevent it rotating in the direction opposite arrow 88 about the axes of shafts 61, keyed to each shaft 61 is an annular member 93. Mounted on each member 93 is a horizontally elongated block 94 that extends into overlapping relationship with the adjacent annular member 62. Similarly, a block 95 is welded to each member 62 to extend into overlapping relationship with the adjacent member 93, said blocks being located to abut against one another when the arms 63 are vertical and the ramp is vertical to prevent the ramp rotating in the direction opposite arrow 88 about the axes of shaft 61; but at the same time to permit the ramp being rotated in the direction of the arrow 88. Thus, the blocks are angularly spaced when the ramp is in a loading position (solid line position of FIG. 1), and further angularly spaced when the ramp is in a position to permit rotating the turntable (solid line position of FIG. 4).

For purposes of facilitating the description of the use of the apparatus of this invention, it will be assumed that the trailer hitch is attached to a pulling vehicle and the ramp is in the vertical dotted line position of FIG. 1. Now upon loosening the chains (not shown) from one of the sets of eye bolts 89, 90 the ramp is pivoted in the direction of the arrow 88 at about the axes of pivots 61 to the inclined solid line position of FIG. 1. Arms 63 remain vertical since lock members 83 extend into notches 82 of the lock arms. At this time ramp frame member 53 abuts against or is closely adjacent the ground while ramp frame member 54 is at approximately the same elevation and longitudinally closely adjacent or abutting against turntable frame member 41. Note that the ramp is pivotable a limited amount about axes of shafts 61 whereby frame member 53 will abut against the ground even though the ground level is varied within limits relative the turntable in a horizontal condition. Now the vehicle to be hauled by the trailer, for example, a snowmobile, is driven up on the ramp onto the turntable bed 48. Then the ramp is pivoted in the direction opposite arrow 88 to a vertical position whereby blocks 94, 95 abut to prevent further pivotal movement of the ramp in the above mentioned direction and the chains (not shown) are attached to eye bolts 89, 90 to prevent the ramp pivoting about the axes of shafts 61 in the direction of arrow 88. To be mentioned is that in place of members 93—95 for limiting the pivotal movement of the ramp in a direction opposite arrow 88 to a vertical position when the arms 63 are upright, there may be provided an arm (not shown) that is welded to shaft 61 to abut against shaft 65 or structure thereon (for example member 64) when arms 63 and the ramp are vertical to perform the same function as members 93—95.

After the trailer has been pulled to the new location, the ramp is again moved to the loading position (solid line of FIG. 1) as previously described. For purposes of further illustrating the invention, assuming that the vehicle on the turntable is a snowmobile and accordingly it is desirable to rotate the turntable 180° so that the snowmobile may be driven forwardly off the turntable and over the ramp, then one of the handles 78 is grasped and pivoted in the direction of the arrow 98 about shaft 71. Due to the transverse bar 77 connecting the lock arms, pivoting one of the handles in the aforementioned manner will result in both handles being pivoted the same amount. This pivotal movement of the handles rotates the lock arms such that the lower horizontal legs of lock members 83 are no longer located within the confines of the notch 82. Thereupon, pushing rearwardly on the handles 78, and if necessary elevating the end of the ramp having transverse frame member 53 slightly, the arms 63 are pivoted in the direction of the arrow 67 about shafts 65. This results in frame member 54 being moved rearwardly of, and to a lower elevation than, the turntable frame. Now the turntable may be easily manually turned 180°, and thereafter a manual force exerted on handle 78 to rotate arms 63 from the solid line position of FIG. 4 to the vertical position. At this time, ramp frame member 54 will either abut against or be very closely adjacent to turntable frame member 40 to prevent the turntable rotating. The handle 78 is pivoted in the direction opposite arrow 98 about shaft 71 so that the lower legs of lock members 83 are located in notches 82 to prevent the arms 83 rotating in the direction of arrow 67 from a vertical upright position. Thence the snowmobile may be driven off the turntable and down the ramp onto the ground.

When the ramp is either in the solid line or dotted line position of FIG. 1, ramp frame member 54 through the lock mechanism is retained at the elevation of turntable frame members 40, 41 and sufficiently closely adjacent to one or the other of said frame members to prevent the turntable rotating about the axis of stud shaft 32. However, when the ramp is in the solid line position of FIG. 4, the ramp is at a sufficiently lower elevation than the turntable that the turntable may be freely rotated.

Even though the apparatus of this invention has been described with the ramp being mounted on the rear end of the turntable, it is to be understood that the ramp may be mounted on one or the other side of the trailer frame for movement between a vertical position, a trailer loading position, and a position permitting rotation of the turntable relative the trailer frame. Also the rollers 45 may be dependingly mounted on the turntable frame to roll on a ring mounted on a ring mounted on the trailer frame.

Also even though the arms 63 having been described as being vertical when the ramp is in position to block rotation of the ramp, it is to be understood that, if for example the trailer frame terminated forwardly of the turntable, then the arms 63 would be mounted for movement between a first inclined position to position the ramp one end at a location to block rotation of the turntable when the ramp was either in a vertical position or a vehicle loading position and a second position that the turntable may be rotated at least 180° relative the trailer frame.

Using the apparatus of this invention, two snowmobiles may be located in side by side relationship on the trailer bed and either one may be driven off the ramp without having to move the other. Additionally by using the mechanism of this invention, the entire width and length of the trailer frame may be used for carrying a load; *i.e.* on a rectangular planar trailer bed, and in a ramp loading position the ramp extends to approximately the same height as the bed. Further the ramp in either a vertical transport or a ramp loading position prevents the turntable from rotating.

We claim:

1. In trailer apparatus, a trailer having a trailer frame, a turntable mounted on the trailer frame for rotation about a vertical axis from a datum transport position to a position substantially angularly spaced from the transport position, an elongated loading ramp having a first end portion and a ground engagable second end portion and first means mounting the ramp on the trailer frame for movement between an inclined vehicle loading first position that the ramp second end portion is adjacent ground level and a vertical transport second position wherein the ramp in said second position blocks the turntable from being rotated.

2. In trailer apparatus, a trailer having a trailer frame, a turntable mounted on the trailer frame for rotation about a vertical axis from a datum transport position to a position substantially angularly spaced from the transport position, an elongated loading ramp having a first end portion and a ground engagable second end portion and first means mounting the ramp on the trailer frame for movement between an inclined vehicle loading first position that the ramp second end portion is adjacent ground level and a vertical transport second position, the turntable in a datum position extending sufficiently close to the ramp in the vertical position that the ramp blocks rotation of the turntable and said first means including second means mounting the ramp on the trailer frame for movement to a third position sufficiently out of the path of rotation of the turntable to permit rotating the turntable at least 180° from the datum position.

3. In trailer apparatus, a trailer having a trailer frame, a turntable mounted on the trailer frame for rotation about a vertical axis from a datum transport position to a position substantially angularly spaced from the transport position, an elongated loading ramp having a first end portion and a ground engagable second end portion and first means mounting the ramp on the trailer frame for movement between an inclined vehicle loading first position that the ramp second end portion is adjacent ground level and a vertical transport second position, the first means including a pair of elongated first arms each having a first end portion and a second end portion, second means for connecting the arms first end portions to the ramp first end portion for pivotal movement about a first horizontal axis and third means for connecting the arms second end portions to the trailer frame for pivotal movement about a second horizontal axis parallel to the first axis between a first angular position that the ramp first end portion is closely adjacent the turntable and a second angular position that the ramp first end portion is at a lower elevation and substantially more remotely spaced from the turntable than when the arms are in their first position.

4. The apparatus of claim 3 further characterized in that there is provided fourth cooperating means in part mounted on the trailer frame and in part connected to said arms for releasably locking the arms in their first angular position.

5. The apparatus of claim 4 further characterized in that the fourth means includes a lock member mounted on the trailer frame and an elongated lock arm pivotally connected to one of said first arms for cooperating with the lock member to releasably retain the first arm it is connected to in its first angular position.

6. The apparatus of claim 5 further characterized in that there is provided means connected to the lock arm to abut against the trailer frame to limit the pivotal movement of said first arms in an angular direction from the first angular position to the second angular position that the first arms in the second angular position are inclined upwardly and away from the trailer frame.

7. The apparatus of claim 6 further characterized in that the lock arm has an elongated upper edge and that the lock member has a horizontal leg to abut against the lock arm upper edge when the first arms are in their second angular position.

8. Trailer apparatus comprising a trailer having a trailer frame, a turntable mounted on the trailer frame for rotation about a vertical axis from a transport datum position to a position substantially angularly spaced from the transport position, a loading ramp, and first means mounted on the trailer frame for mounting the ramp for movement between an inclined first position for moving a load over the ramp onto the turntable and blocking rotation of the turntable and a second position permitting the turntable being rotated.

9. The apparatus of claim 8 further characterized in that there is provided second means for releasably locking the ramp in a fixed position relative the turntable in the ramp first position.

10. The apparatus of claim 8 further characterized in that the turntable has opposite transverse edge portions, a pivot member and means for connecting the pivot member to said turntable edge portions centrally between said turntable edge portions, that the ramp has opposite first and second transverse frame members and that the first means includes elongated arms having first end portions connected to the trailer frame to pivot about a common horizontal axis and second end portions connected to the ramp first transverse frame members for pivotal movement relative the ramp about a horizontal axis parallel to the first mentioned horizontal axis, and that there is provided cooperating means connected to the trailer frame and at least one of said arms for releasably locking the last mentioned arm in a position the ramp first frame member is adjacent and about the same elevation as the turntable as one of the turntable edge portions.

11. The apparatus of claim 8 further characterized in that the first means includes a pair of elongated first arms having first end portions and second end portions, second means connecting the arms first end portions to the ramp for pivotal movement relative the ramp about a horizontal axis, and third means connecting the arms second end portions to the trailer frame for movement between a third position the arms first end portions position the ramp to block rotation of the ramp and a fourth position that the ramp is at a lower elevation than the turntable and more remote from the turntable than the ramp is in the arms third position.

12. The apparatus of claim 11 further characterized in that the turntable in horizontal plane is generally rectangular, and there is provided cooperating means in part mounted by one of said frames and in part by at least one of said arms for releasably retaining the arms in said third position.

13. The apparatus of claim 11 further characterized in that the second means includes a shaft connected to the ramp to rotate therewith and means connected to said shaft for blocking rotation of the ramp in a direction from a ramp loading position to a vertical position to a generally vertical position.